United States Patent [19]

Uhlemann et al.

[11] Patent Number: 4,612,488
[45] Date of Patent: Sep. 16, 1986

[54] APPARATUS FOR CONTROLLING THE DIRECTIONAL ORIENTATION OF A RADIATION RECEIVER DEVICE TO A LIGHT SOURCE

[75] Inventors: Reinhard Uhlemann, Jülich; Walter Oster, Kleve-Kellen, both of Fed. Rep. of Germany

[73] Assignee: Kernforschungsanlage Jülich Gesellschaft mit beschränkter Haftung, Jülich, Fed. Rep. of Germany

[21] Appl. No.: 746,961

[22] Filed: Jun. 20, 1985

[30] Foreign Application Priority Data

Jun. 20, 1984 [DE] Fed. Rep. of Germany ....... 3422813

[51] Int. Cl.$^4$ .............................................. B64C 3/18
[52] U.S. Cl. .................................. 318/582; 318/640; 250/203 R; 244/3.18
[58] Field of Search ............... 318/640, 480, 582; 250/203 R, 203 S; 244/3.18

[56] References Cited

U.S. PATENT DOCUMENTS

| | | | |
|---|---|---|---|
| 2,513,367 | 7/1950 | Scott | 250/203 R |
| 2,981,843 | 4/1961 | Hansen | 318/582 X |
| 3,379,891 | 4/1968 | Aroyan | 250/203 R |
| 3,496,367 | 2/1970 | Eckermann | 318/582 |
| 3,944,167 | 3/1976 | Figler et al. | 250/203 R X |
| 3,949,582 | 4/1976 | Eaton et al. | 72/8 |
| 4,000,449 | 12/1976 | Gripp | 318/72 |
| 4,093,154 | 6/1978 | McLean | 244/3.16 |
| 4,221,995 | 9/1980 | Barkman | 318/616 |
| 4,267,497 | 5/1981 | Cannon et al. | 318/661 |

FOREIGN PATENT DOCUMENTS 2126702 12/1971 Fed. Rep. of Germany.
1312663 4/1973 United Kingdom.

OTHER PUBLICATIONS

*Automatische Lageerkennung mit optoelektronischen Empfängern,* Manfred Jacksch, Harald Schmalwasser, BILD UND TON-12/1983-36, Jahrgang, pp. 374-378.

Primary Examiner—B. Dobeck
Attorney, Agent, or Firm—Nils H. Ljungman

[57] ABSTRACT

A controller for a tracking system which tracks the sun. The controller has a rotatable disc with a light transmitting portion and an opaque portion. The solar radiation, transmitted through the disc when rotating, falls on optically sensitive sensor detecting the light intensity. Two optical emitter/receiver pairs which are oriented with respect to two coordinate axes at the periphery of the disc detect the position of the light spot on it. The solar radiation is directed by the rotating disc to generate two signals which are related to the two coordinate axes and the tracking error of the tracking system. The signals energize motors in the tracking system whereby the sun is tracked.

21 Claims, 12 Drawing Figures

APPARATUS FOR CONTROLLING THE DIRECTIONAL ORIENTATION OF A RADIATION RECEIVER DEVICE TO A LIGHT SOURCE

BACKGROUND OF THE INVENTION

1. Field of the Invention

The present invention relates to a tracking control apparatus for determining the orientation of a solar radiation receiver device, which especially could be a solar concentrator which can be directionally-controlled in relation to two coordinates, to a light source which is moving relative to that device and including a sensor whose optical axis is oriented toward the light source in a fixed spatial correspondence to the tracking control apparatus, and specifically to the tracking of solar concentrators in relation to two coordinates.

2. Description of the Prior Art

Solar concentrators having a high concentration ratio of 300 or more must track the sun with a high precision of better than 0.1° in order to operate with the desired efficiency. For this purpose, the solar radiation energy must, as much as possible, travel at all times without loss from the concentrator to the radiation receiver, and a tracking control apparatus is provided to track the movement of the sun in two axes throughout the day.

In theory, this tracking can be done by a fixed control program which is based on the predetermined movement of the sun. However, since operational variations can occur as a result of tolerances in bearings and transmissions, imprecise erection, errors in the position control components, in the angular control and as a result of wind, a tracking control apparatus is generally provided which is directly dependent on the incidences of light.

It is known in the prior art to provide tracking control apparatus including a number of light-sensitive cells and shadow columns for precision adjustment, which operate with sufficient sensitivity in clear weather and experience a deterioration in performance in the presence of fog, clouds and mist. Their tracking accuracy is only about 0.2° (12'), which is not sufficient for high-concentration ratio solar radiation receivers.

Examples of optical position sensing equipment and devices are shown in "Automatische Lageerkennung mit optoelektronischen Empfängern".

An example of an optical control arrangement is shown in British Pat. No. 1,312,663 which corresponds to German Laid Open Application No. 21 26 702.

Examples of positioning systems are found in U.S. Pat. Nos. 4,267,497; 4,221,995; 4,093,154; 4,000,449; and 3,949,582, all of which are incorporated herein by reference.

OBJECT OF THE INVENTION

It is an object of the present invention to provide a tracking control apparatus for the orientation of a directionally-controllable radiation receiver device in relation to a light source moving relative to it, which is suitable for the tracking of solar concentrators, and which finds the visible center of radiation in the sky and determines the orientation with the desired high precision, regardless of fog, clouds, mists, and so forth.

SUMMARY OF THE INVENTION

The present invention developed for this purpose is characterized by the fact that the sensor includes a system for the production of an image of the light source on a rotating control disc, which disc is larger than the surface covered by the fluctuating image of the light source, and which disc exhibits a light-permeable slit that extends radially outward to the maximum possible image excursion and radially inward at least to the periphery of the centered image of the light source, behind which disc there is a light receiver for the amount of light that penetrates the radial slit and, outside the radial slit, two concentric semi-circular or azimuthal light-permeable slits with a different radius and each with a corresponding fixed light transmitter, ($E_1$, $E_2$) the light from which falls through the appropriate azimuthal slit onto a fixed light receiver ($T_1$, $T_2$), whereby for tracking axes of the directional-controllable device which are perpendicular to one another, there is always one transmitter-receiver pair in the center of the corresponding azimuthal slit, when the second transmitter-receiver pair is at the beginning of its corresponding azimuthal slit, and whereby the body of the sensor tube together with the fixed transmitter-receiver pairs inside it can be mounted on the device to be controlled, for tracking in relation to the coordinate system (x,y) in the space in which the two-coordinate control is to operate, so that it can be rotated around its optical axis and then be fixed or adjusted after such a rotation, so that the radial slit points in the direction of one of the coordinate axes when one of the transmitter-receiver pairs, and specifically the first pair, is at the beginning of the corresponding azimuthal slit, and by an electrical control for controlling the speed and direction of rotation of a tracking motor or motors, according to the variation recognized in terms of magnitude by the radial receiver and in terms of direction by the azimuthal receiver.

The image-producing system is specifically a lens system which, in the application to control the tracking by solar concentrators, produces an image of the sun on the control disc.

In this apparatus, a quantity of light corresponding to the excursion magnitude is received through the radial slit, while the excursion direction is measured by means of the azimuthal slits and the transmitter-receiver pairs.

The electronic control circuit comprises an integral regulator, which produces a control signal that becomes proportionally smaller as the desired position is approached and which is divided into an x-signal component and a y-signal component corresponding to the direction coordinates of deviation. These control signals components are used for tracking in respectively two axes with the aid of two adjustable direct-current motors or a single tracking motor. The control signals can also be used for the required comparison of set values and measured values for computer-controlled concentrators.

The control apparatus can be used to track:

parabolic or spherical concentrators (parabolic dishes) according to the solar farm principle, heliostats or heliostat fields for solar tower installations (required precision 0.02°–0.05°), test installations for solar high temperature production with concentration ratios over 1000, but also for light source tracking in the field of navigation, and for target tracking in aviation, space travel and maritime navigation.

The principle elements of the apparatus will be described in greater detail below, with reference to the attached drawings.

DESCRIPTION OF THE PREFERRED EMBODIMENTS

Figure 1:
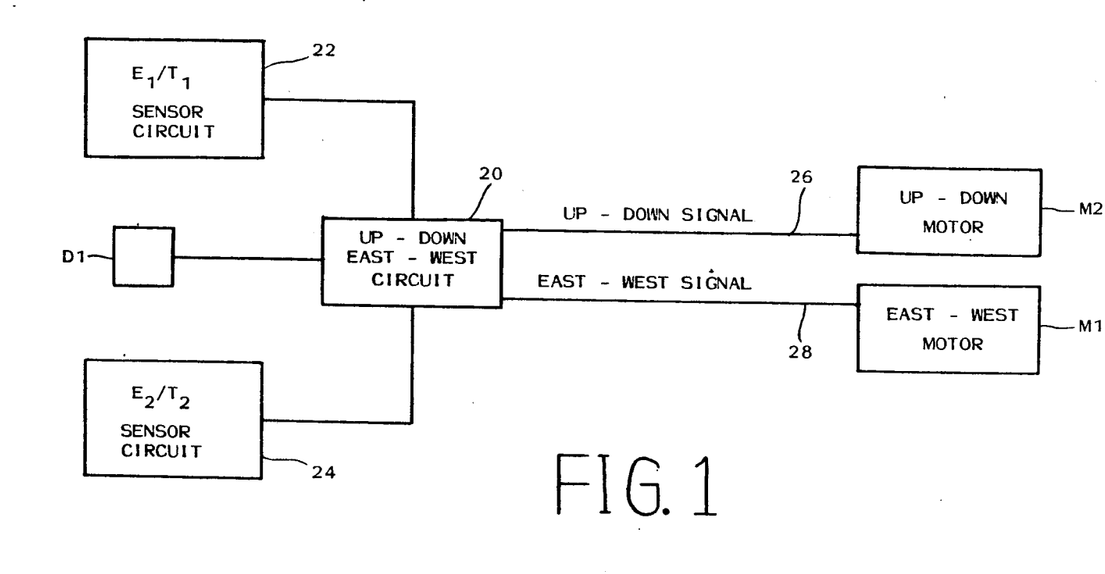
FIG. 1 is a block diagram of the electrical operating components according to the invention.
Figure 1A:
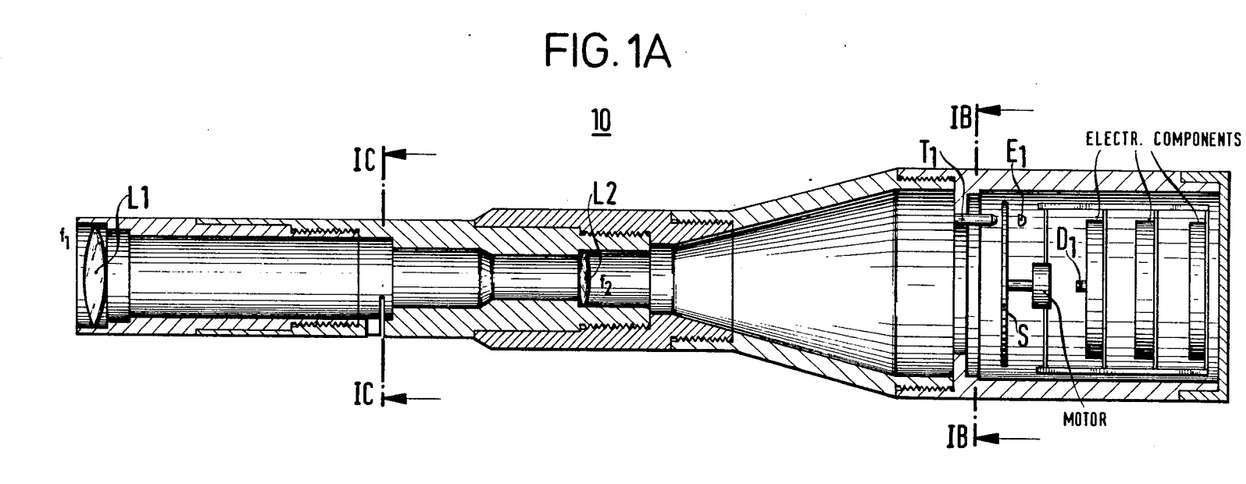
FIG. 1A shows the sensor tube with two lenses.
Figure 1B:
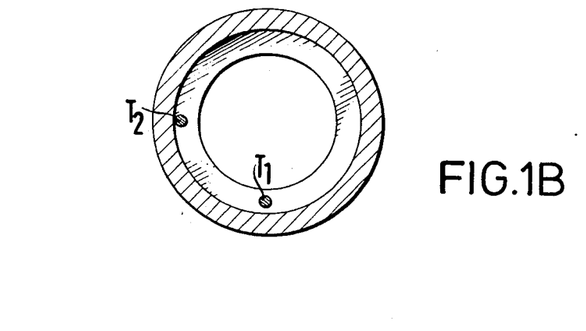
FIG. 1B and 1C are cross sections of portions of the sensor tube of FIG. 1 according to the invention.
Figure 1C:
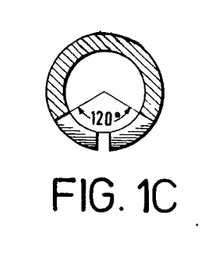

FIG. 1 shows a fixed photocell $D_1$ connected to an up-down, east-west signal generating circuit 20 which generates two signals which are preferably proportional to the misalignment of a sensor tube 10 as shown in FIG. 1A. A coordinate sensor circuit 22 which preferably includes a transmitter-receiver pair $E_1/T_1$ is connected to an input of the up-down, east-west signal generating circuit 20 and controls a signal component of a signal from the photocell $D_1$ in one coordinate. A coordinate sensor circuit 24 which preferably includes a transmitter-receiver pair $E_2/T_2$ is connected to an input of the up-down, east-west signal generating circuit 20 and controls a signal component of a signal from the photocell $D_1$ in another coordinate.

The up-down, east-west signal generating circuit 20 generates an up-down error signal in the up-down signal channel 26 which drives an up-down motor $M_2$ until the up-down error signal is virtually zero or so small that the tracking error is within a given tolerance. The up-down, east-west signal generating circuit 20 generates an east-west error signal in the east-west signal channel 28 which drives an east-west motor $M_1$ until the east-west error signal is also virtually zero or so small that the tracking error is within a given tolerance.

The sensor tube 10 shown in FIG. 1A contains two lenses $L_1$ and $L_2$, which can be biconvex achromatic lenses, having respective focal lengths of $f_1=200$ mm and $f_2=16$ mm to give a total optical focal length of approximately 2 m with a reduced structural length of approximately 40 cm. The sensor sensitivity can be adjusted by means of an iris diaphragm (not shown) provided at position A.

Figure 2:
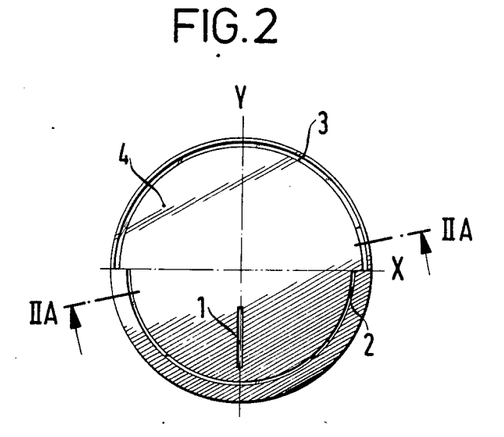
FIGS. 2 and 2A show a control disc for the sensor.
Figure 2A:
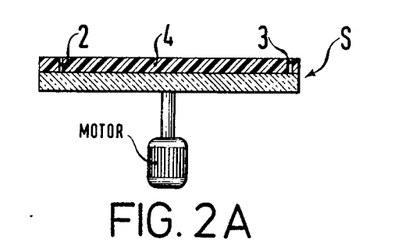

A solar image of approximately 2 cm in diameter is thereby projected in sharp focus on the control disc S that can be made of plexiglass and which is shown in greater detail in FIG. 2, and includes a radial light permeable slit 1 that is 20 mm long and 2 mm wide to determine the location resolution and two azimuthal or semi-circular slits 2 and 3 in a covering member 4 impermeable to light as indicated by the diagonal lines. The radial slit 1 is 10 mm from the center of the disc S, and is thereby directly adjacent to the precisely-centered solar image.

The control disc S rotates at approximately 100 Hz, and during one revolution the field, which is dark at the set position, surrounding the solar image is sampled by the radial slit 1. If the solar image corresponding with the optical axis of the tracking system, deviates from the set position, this slit 1 measures a more or less large crescent-shaped segment of the bright solar image, the light from which segment falls preferably through a diffusion disc such as a Marata disc onto the fixed photocell $D_1$ and the output signal from which corresponds to the absolute value of the deviation from the set position. The fixed photocell $D_1$ is sufficiently large and positioned so that light, transmitted through the radial slit and thus through the diffusion disc, impinges upon the photocell $D_1$ which then generates a signal indication of the light impinging thereon.

Figure 4:
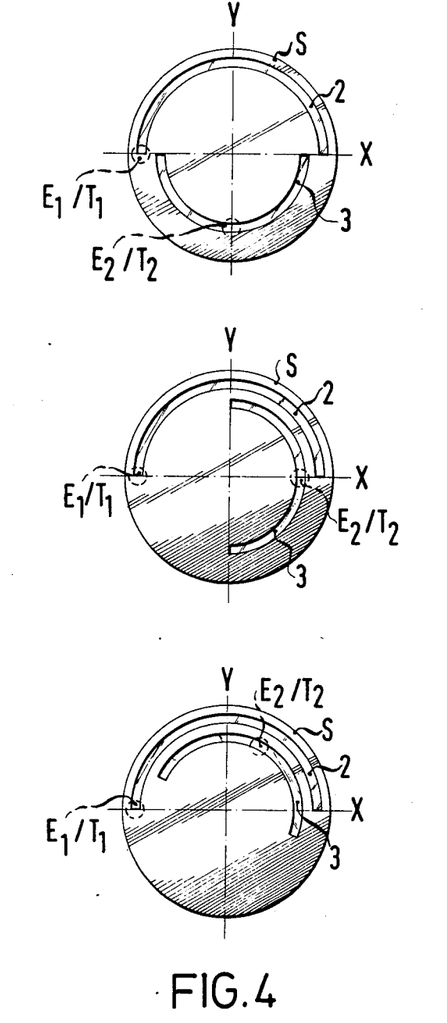
FIGS. 4 and 5 are examples of possible positions of the azimuthal slits and the radial slit on the control disc, according to the invention.

The azimuthal slits 2 and 3 on the edge of the control disc S when added together preferably cover 360° for most proper production. Additional suitable positional relationships of the azimuthal slits 2 and 3 are shown in FIG. 4. Two corresponding pairs of fixed IR transmitter-receivers $E_1/T_1$ and $E_2/T_2$ which are in this example installed with an offset of 90° from one another (compare first scheme of FIG. 4), each form a photoelectric barrier, by means of which the position of the control disc is measured in the course of one complete revolution. The output of these receivers $E_1/T_1$ and $E_2/T_2$ is used for the directional control of the tracking mechanism, as a function of the excursion of the solar image from the desired set point as measured by the radial slit 1. The transmitters $E_1$ and $E_2$ of the fixed infra red transmitter-receivers $E_1/T_1$ and $E_2/T_2$ are preferably disposed and emit an IR signal behind the control discs which is projected through the azimuthal slits 2 and 3, respectively, onto a phototransistor which forms the receiver portion $T_1/T_2$ respectively of the transmitter-receiver pairs $E_1/T_1$ and $E_2/T_2$ (as shown in FIG. 1A). The transmitter-receiver pair $E_1/T_1$ 22 and the transmitter-receiver pair $E_2/T_2$ 24 generate signals which control the up-down east-west signal generating circuit 20 so that the signal generated by photocell $D_1$ is separated into an up-down signal in the up-down signal channel 26 and an east-west signal in channel 28 by separating the signal corresponding to the location of the solar image on the disc S into orthogonal (or x-y) components and then using these up-down and east-west signals to drive sensor tube into alignment with the sun and thus reduce these signals under a given threshold.

Figure 5:
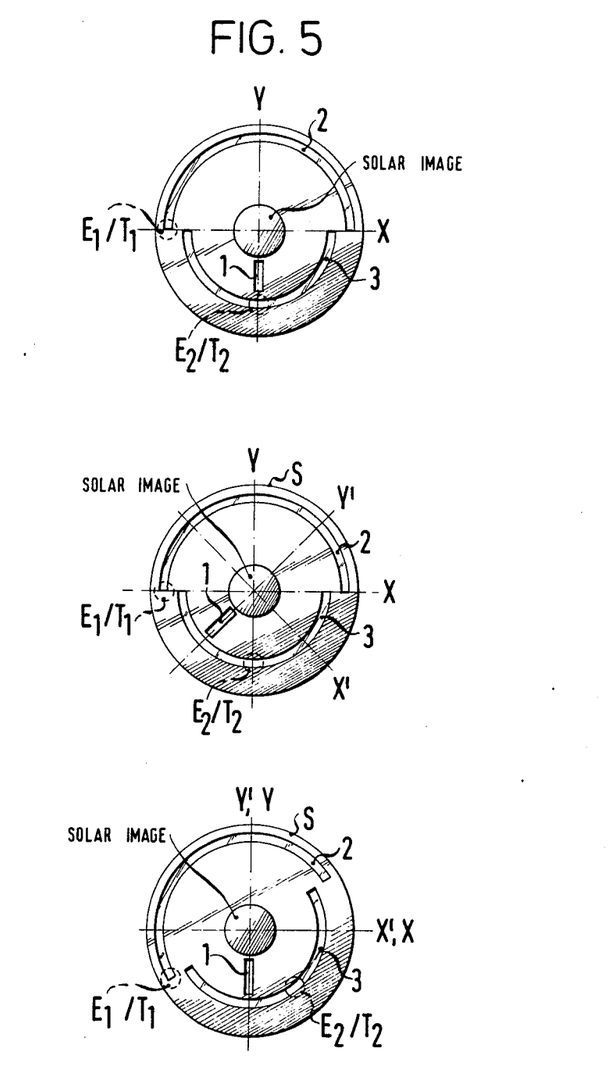

The location of the radial slit 1 on the control disc S is in relation to the azimuthal slits 2 and 3 and was placed in the axis of symmetry of the azimuthal slits 2 and 3. Further examples are illustrated in FIG. 5. A modification of the layout of the radial slit means, with a fixed position of the light transmitter-receiver pair $E/T_1$ and $E_2/T_2$, a rotation of the x-y coordinate intersection. If, as is generally done, the x-axis is selected horizontal and the y-axis is selected vertical in space, then, for example, the position of the light transmitter-recevier pair $E_1/T_1$ and $E_2/T_2$ can be set at 180° and 270° as shown in FIG. 1A, Section B-B. The sensor tube, when incorporated into the concentrator, is accordingly to be positioned approximately horizontal such that the x-axis thereof is and the y-axis thereof is approximately vertical.

The azimuthal slits 2 and 3 together with the IR transmitter-receiver pairs $E_1/T_1$ and $E_2/T_2$ measure the direction of deviation of the solar image in x and y components, whereby the reference orientation of the coordinates which are perpendicular to one another can be set wherever desired, generally horizontally and vertically. The IR receivers make certain that the x and y integrators A4 and A5 connected in series behind the respective light transmitter-receivers $E_1/T_1$ and $E_2/T_2$ according to the current bright-dark circuit, depending on the position of the control disc S, are given either the positive or the inverted signal, the absolute value of which corresponds to the vectorial excursion of the sun image from the set position.

A small electric motor M, for example, made by the Graupner Company and designated Micro TO5, or equivalent, provides the revolution of the control disc S. The motor speed determines the time for one cycle, which is 0.1 sec at 6000 rpm (100Hz), and is sufficient for most applications. In this length of time, the sun travels approximately $4 \times 10^{-4}$ degrees (0.03'). The motor M is driven with a constant voltage of 1 V, which can be derived by means of simple transistor regulator from transisitor transistor logic feed voltage, shown in FIG. 3A.

Figures 3, 3A:
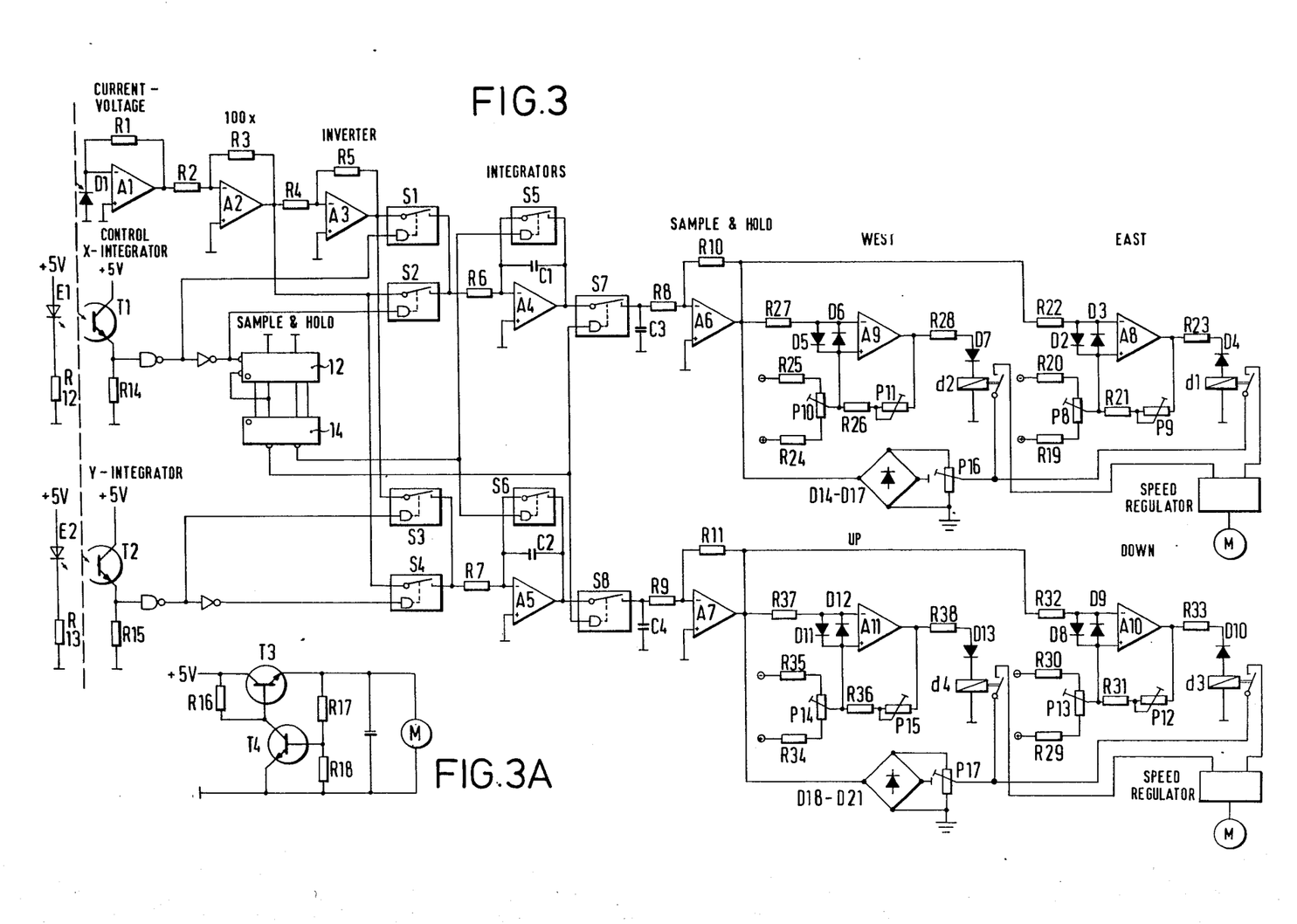
FIG. 3 shows a circuit diagram for the sensor electronics, according to the invention.
FIG. 3A shows a circuit diagram for connection to the disc motor.

FIG. 3 shows a representative circuit which incorporates the functions of the up-down signal in 20 (FIG. 7) and the motors $M_1$ and $M_2$. Many other circuits, well known in the prior art, could also perform these functions. Examples of closed loop control systems are found in, for example, U.S. Pat. Nos. 3,949,582 entitled Positioning Servo and Controlled Mechanism; 4,221,995 entitled Linear Motor Drive System for Continuous-path Closed-loop Position and 4,267,497 entitled Resolver interface for Servo Position Control which are incorporated herein by reference.

During the sampling of the environment of the set point with an output signal of zero by the control disc S, all of the light beams present in the circumference of the set point max ±0.75 degree from the center of the image of a solar image deviating from the set point are received by the photocell $D_1$ working in short circuit operation as shown in FIG. 3, and the signal supplied by the cell $D_1$ is processed by operational amplifiers $A_1$, $A_2$ and $A_3$ and in the current-voltage converter $A_1$, the output current of the photocell $D_1$ is converted into a proportional voltage. The subsequent amplifier stage $A_2$ was set at an amplification of 100 times. The amplified signal is conducted to two analog switches S2 and S4 and is forwarded, depending on the position of the control disc S in the angular range: $-90°$ to 91° to the x-integrator A4 and 0° to 180° to the y-integrator A5.

The inverter stage A3 inverts the signal coming out of the amplifier stage A2 which is also forwarded via analog circuits S1 and S3 in the angular range: 90° to 270° to the x-intgrator A4 and 180° to 360° to the y-integrator A5.

The control of the analog circuits, which is a function of the angular position of the control disc S, assures that the subsequent integrators A4 and A5 therefore receive both the amplified signal and, after a revolution of the perforated disc S by 180°, the inverted (phase-shifted) signal. The y-integrator receives the signal with a phase shift of 90°.

The integrators A4 and A5 each deliver a voltage at the output, the value of which corresponds to the arithmetic sum of the instantaneous input voltages over a given length of time determined by the revolution of the control disc S. During nine of the ten revolutions of a cycle, the integrators A4 and A5 are charged or discharged according to the position of the control disc S and the excursion of the solar image.

The subsequent Sample+hold module A6 and A7 takes over the integration signal during the ninth revolution of the control disc S, stores this signal and, while a new measurement cycle is taking place by the control disc S, delivers this signal to the subsequent comparator stage A8, A9, A10, A11, and via the respective diodes bridges D14-17 and D18-21, to the commercial speed regulator or tachometer control for the preferably two direct-current motors M1 for the east-west and M2 for the up-down control operations.

A counter 12 and a decoder 14 in connection with a Schmitt trigger, which is connected to the x-control, delivers a timing pulse which makes it possible to charge the Sample+hold module during the 9th cycle of the perforated disc S through switches S7 and S8 and to discharge the integrator during the 10th revolution of the perforated disc S through switches S5 and S6 providing a system reset. The provided measurement time is thereby 0.09 seconds, and the time of one entire cycle 0.1 seconds.

The output signal of the sample+hold module A6 and A7 reaches the window comparator for the control of the declination motor A10 and A11 and the azimuth motor A8 and A9. The polarity determines through operation of selected relays $d_1$, $d_2$; $d_3$, $d_4$, the direction of rotation of the motors M1 and M2. The speed of the motors M1 and M2 is determined via the absolute magnitude of the signal, which can be coupled diode bridges D18–D21 and D14–D17 to a commercial tachometer or speed regulator, as shown in FIG. 3.

The window comparators turn the motors M1 and M2 on at an output signal of 1 V of the Sample+hold module. That corresponds to an excursion of the sun by 0.05° (3') at approximately 100 W/m² radiation, which is about the lower limit of sensitivity of the sensor. The motors M1 and M2 are turned off when the output signal based on the tracking of the sun returns to 0.1 V, which is about the shutdown threshold of the comparators. When there is more incoming radiation, the angular precision is greater and better than 0.017°; 1'. By adjusting the circuit elements, the characteristics of the sensor can be adapted within broad limits to the requirements desired.

The entire layout decribed here can be installed in a weathertight manner in a tube as shown in FIG. 1A. The measurement apparatus is connected with the regulation apparatus for the two tracking motors by means of multipole cable, which carries both the supply voltage feed of ±12 V, 5 V and 0 V and the measurement value of about ±12 V max.

The sensor described above has a higher tracking precision (0.01°) than the prior art shadow system, which theoretically take measurements by means of shadows cast on a photocell, as well as a greater sensitivity in the presence of weak solar radiation. The optical system here described, together with the electronic system coupled to it, is capable of finding the center of brightness in the sky, and therefore guarantees maximum tracking security. A partial showing of the sun by the passage of clouds, circumsolar radiation caused by high-level fog and mist, or slight differences in the magnitude of the solar image on account of a difference in the earth-sun distance over the seasons such as perihelion and aphelion, therefore have no effect on the sensor.

The sensor was successfully used for several months on a parabola dish test facility, providing a solar energy concentration more than 1500, to produce solar high temperatures from 800° to 1500° C. The concentrator was erected paralactically and is tracked roughly in hour angles by means of a synchronous motor M3 in FIG. 6, providing one revolution per day. For the corrective motions, one direct current motor M1 is coupled via a differential gear to the paralactic axis and another direct current motor M2 is used for the declination axis. The sensor described was coupled to the commercially-available tachometer regulator of both motors. With incoming solar radiation of 900 w/m², the measured deviation from the set point was approximately 0.01° (0.6'), and at 350 W/m² the deviation was approximately 0.02° (1.2'). These deviations were recorded with a precision telescope with cross-lines oriented to the sensor.

No objectionable hunting by the system was observed. The desired angular precision during tracking can be adapted to requirements within broad limits, such as from 0.01° to 0.1° by appropriate selection of the response and shutdown thresholds of the window comparators.

The sensor, as a result of the use of ordinary components, is far more economical than commercial two-coordinate tracking mechanisms, which exhibit a significantly lower precision of approximately 0.18° at 1000 W/m² radiation.

Figure 6:
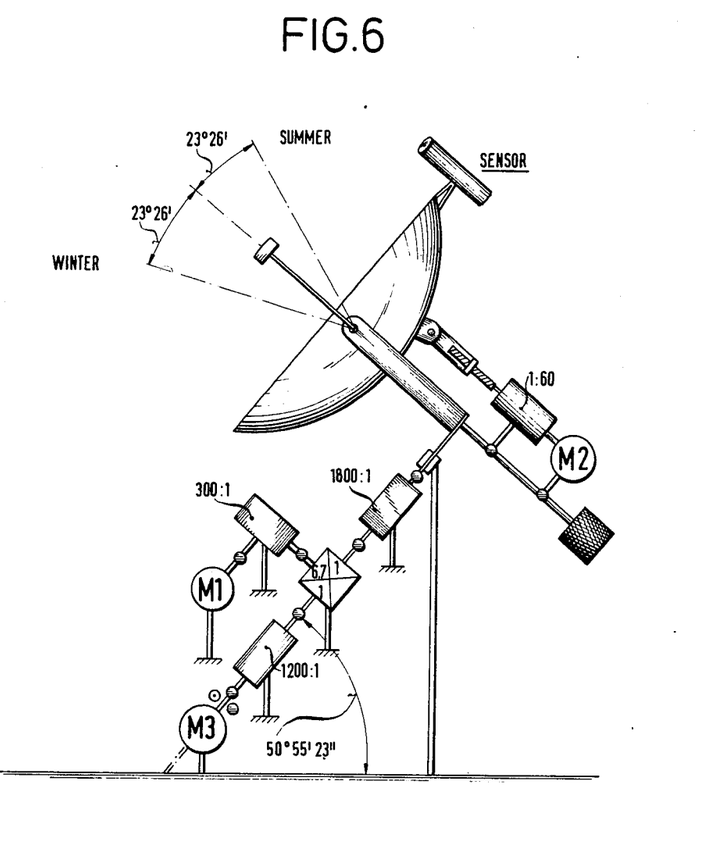
FIG. 6 shows the design of a solar concentrator with a sensor as described by the present invention.

FIG. 6 shows a schematic illustration of a solar concentrator with a sensor as described in accordance with the present invention. The motors M1 and M2 are respectively east-west and up-down tracking motors, and M3 is a synchronous motor for compensation of the apparent daily motion of the sun (1500/Min). The illustrated position corresponds to the southern position in spring or autumn for apparatus used in Northern Europe.

Figure 7:
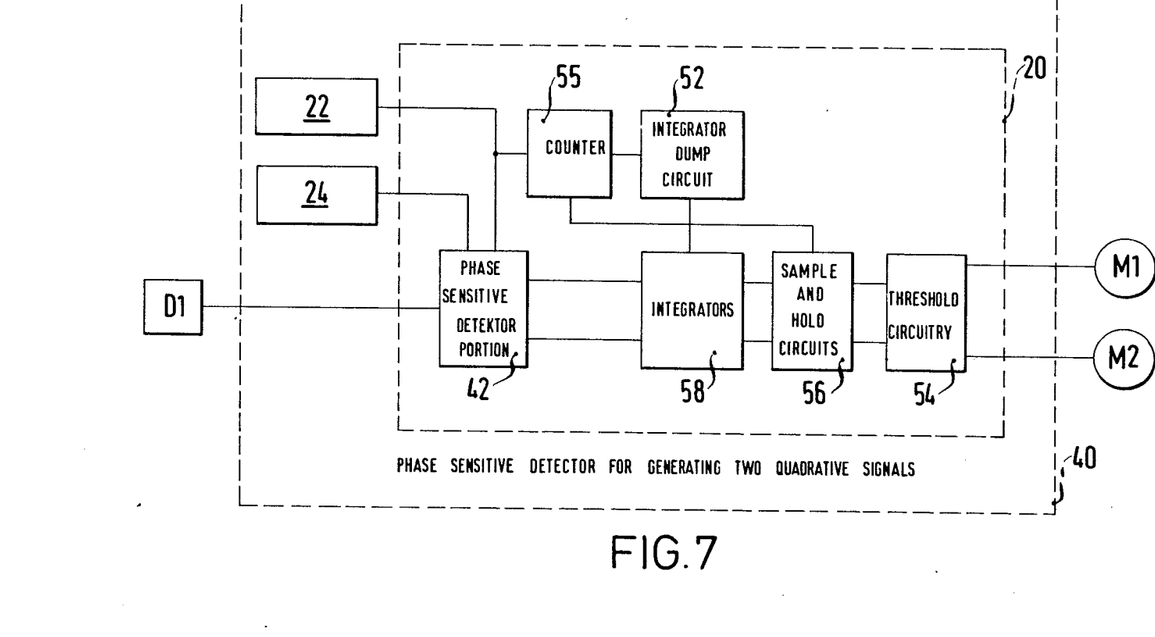
FIG. 7 shows a more detailed block diagram of the components of FIG. 1.

FIG. 7 shows an additional, more detailed, embodiment of the electronic circuitry as shown in FIGS. 1. The coordinate sensor circuits 22 and 24 generate signals which are 90° out of phase with respect to one another which signals are in synchronism with the rotational velocity of the disc S. Signal for coordinate sensor circuits 22 and 24 operate a phase sensitive detector circuit 40 which has a phase sensitive portion 42. These signals generated by photocell $D_1$ are divided into two signals by the phase sensitive detection circuit 40 which are preferably proportional to the displacement of the image from its center along x and y coordinates. The signals corresponding to the x and y coordinates are preferably integrated several cycles in order to reduce switching noise, atmospheric interference, etc. Integrators 58 are provided which are dumped periodically by an integrator dumping circuit 52 which in turn is controlled by a counter circuit 55. To take samples periodically, sample and hold circuits 56 are provided which are controlled by the counter circuit 55. The counter circuit 55 serves to take sample at a predetermined number of disc cycles, to dump the integrators at the following cycle and to start in sequence a new measuring cycle.

Between the motors M1 and M2, there is connected a threshold circuitry 54 for testing and modifying signals to make the signals appropriate for the motors M1 and M2, and for defining the tracking accuracy.

The invention as described hereinabove in the context of a preferred embodiment is not to be taken as limited to all of the provided details thereof, since modifications and variations thereof may be made without departing from the spirit and scope of the invention.

For generating the image of the light source on the rotatable disc, instead of the lens system $L_1$, $L_2$ e.g. mirror objectives or other imaging devices could be provided.

The radial slit 1 of the rotatable disc could be of e.g. triangular shape for a non-linear sensitivity with respect to deviations of the image from the optical axis produced by migration of the light source.

The signals of the light sensitive device receiving light from the radial slit and of the transmitter/receiver pairs are also appropriate for the evaluation of the relative movement of a light source by computer-controlled processing. For this, the signals from the sample and hold circuits 56 could e.g. be supplied to a computer interface.

What is claimed is:

1. A light sensitive device having a control apparatus for orienting said light sensitive device in relation to a source of light, said light sensitive device having an optical axis, said control apparatus being for directionally controlling said light sensitive device with respect to at least two coordinate axes, said at least two coordinate axes being disposed at an angle with respect to said optical axis, and in operation in relation to said light source, said control apparatus comprising:

a rotatable disc having a first and a second side;

means for rotating said disc about a portion of said disc, said rotating means being operatively connected to said disc;

said portion about which said disc is rotatable being aligned with said optical axis of said device;

means for providing an image of said light source, said image providing means being disposed to provide said image on said first side of said disc, said image providing means for providing in operation said image at a predetermined size on said disc;

said disc being larger than said image provided in operation on said first side by said image providing means;

said disc having a first substantially opaque portion about said portion about which said disc is rotatable;

said disc having a light modifying portion extending at least partially outwardly on said disc from said first opaque portion;

a second substantially opaque portion of said disc also at least partially extending outwardly from said first opaque portion of said disc;

light sensitive means for generating an electrical signal when impinged upon by light;

means for dividing said signal from said light sensitive means, when said disc is rotating, into coordinate displacement signals relating to displacement of said image from said optical axis with respect to said at least two coordinate axes;

said light sensitive means being disposed to generate said signal from light related to light acting upon said light modifying portion of said disc;

motive means for orienting said light sensitive device and said optical axis with respect to said at least two coordinate axes; and said signal dividing means being connected to said motive means to drive said device to dispose said image from said image providing means, in operation, onto said first opaque portion of said disc and substantially to orient said image about a predetermined portion of said first opaque portion of said disc including said portion about which said disc is rotatable.

2. The control apparatus according to claim 1 wherein said light modifying portion of said disc comprises a light permeable slit in said disc extending radially from said first opaque portion of said disc.

3. The control apparatus according to claim 2 wherein said slit extends outwardly a predetermined amount to form said slit which has a predetermined length, said predetermined length being proportional to a predetermined angle of displacement, in operation, of said image from said portion of said disc about which said disc is rotatable.

4. The control apparatus according to claim 3 wherein said predetermined size of said image on said disc is a diameter of said image and wherein said predetermined length of said slit being substantially equal to said diameter of said image on said disc.

5. The control apparatus according to claim 1 including light diffusing means disposed adjacent to said second side of said disc, said light sensitive means also being disposed at said second side of said disc, said light diffusing means being disposed between said disc and said light sensitive means.

6. The control apparatus according to claim 3 wherein said coordinate dividing means has means for dividing said signal from said light sensitive means into a signal for controlling substantially vertical movement of said light sensitive device and for dividing said signal from said light sensitive means into a signal for controlling substantially horizontal movement of said light sensitive device.

7. The control apparatus according to claim 6 wherein said horizontal-vertical signal dividing means has means for dividing said signal from said light sensitive means into two signals which are displaced by 90° one from the other.

8. The control apparatus according to claim 4 wherein said disc has a diameter being at least three times as great as said predetermined diameter of said image.

9. The control apparatus according to claim 7 wherein said signal dividing means includes two azimuthal slits disposed on said disc concentrically about said portion about which said disc is rotatable, said signal dividing means including optical signal generating means, said azimuthal slits being disposed to activate said optical signal generating means to generate signals for dividing said signals from said light sensitive means into said 90° displaced signals.

10. The control apparatus according to claim 7 wherein said signal dividing means includes integrator means for integrating each of said two signals having components originating from said light sensitive means whereby said two signals are integrated over a plurality of cycles of said means for dividing said signal into two signals and thereby providing substantially noise free signals to said motive means.

11. The control apparatus according to claim 10 wherein said integrator means includes means for integrating said integrator means over a predetermining number of said cycles of said means for dividing said signal from said light sensitive means into said two signals which are displaced 90°.

12. The control apparatus according to claim 1 wherein motive means comprises tracking motors, said signal dividing means comprises circuits having amplifiers and invertors which amplify and invert the signal from said light sensitive means and further said signal divides means comprises integrators for the two directions of the two-coordinate control according to the position of the image on the rotating disc; two sample and hold means, one means for each of said two coordinates; a comparator circuit for comparing signals corresponding to said two coordinates with reference signals; means for initializing said integrator means to accept a following signal cycle, sample and hold means being connected such that signals therefrom are compared in said comparator circuit, which comparator circuit determines the response threshold of the tracking motors and their directions of rotation; and said motive means including speed control means.

13. The control apparatus according to claim 12 wherein said light modifying portion of said disc comprises a light permeable slit in said disc extending radially from said first opaque portion of said disc.

14. The control apparatus according to claim 12 wherein said slit extends outwardly a predetermined amount to form said slit which has a predetermined length, said predetermined length being proportional to a predetermined angle of displacement, in operation, of said image from said portion of said disc about which said disc is rotatable.

15. The control apparatus according to claim 14 wherein said predetermined size of said image on said disc is a diameter of said image and wherein said predetermined length of said slit being substantially equal to said diameter of said image on said disc.

16. The control apparatus according to claim 12 including light diffusing means disposed adjacent to said second side of said disc, said light sensitive means also being disposed at said second side of said disc, said light diffusing means being disposed between said disc and said light sensitive means.

17. The control apparatus according to claim 14 wherein said coordinate dividing means has means for dividing said signal from said light sensitive means into a signal for controlling substantially vertical movement of said light sensitive device and for dividing said signal from said light sensitive means into a signal for controlling substantially horizontal movement of said light sensitive device.

18. The control apparatus according to claim 17 wherein said horizontal-vertical signal dividing means has means for dividing said signal from said light sensitive means into two signals which are displaced by 90° one from the other.

19. A control apparatus for determining the orientation of a solar radiation receiver device for tracking a source of light which device can be directionally-controlled in at least two coordinate axes in relation to said light source moving relative to said receiver device and controlled in fixed spatial correspondence to the tracking device, said receiver device having an optical axis, the combination of:
  sensor means oriented to receive light from said source and including optical means for providing an image of the light source;
  a rotating control disc larger than the provided image of said light source which disc rotates about an axis, including a light-permeable admitting slit positioned on said disc and extending radially outward to a predetermined image excursion of said image of said light source on said disc and radially inward at least to the periphery of the image of the light source on said disc when the light source is centered on said disc;
  said sensor means having light sensitive means positioned said disc on a side of said disc opposite said image and responsive to light which penetrates said radial slit;

said disc also including two concentric semi-circular light-permeable slits, each having a different radius;

a pair of light transmitter/receivers respectively operative with the light through a different one of two said azimuthal slits for tracking said axes of said receiver device, said pairs of light transmitter/receivers being positioned such that one light transmitter/receiver pair is in the center one corresponding azimuthal slit when the second light transmitter/receiver pair is at the beginning of its corresponding azimuthal slit during operation;

said fixed transmitter/receiver pairs, being initially adjusted by rotating their mounting around said optical axis such that the radial slit points in the direction of one of the coordinate axes when the first azimuthal transmitter/receiver pair is at the beginning of the corresponding azimuthal slit; and motor means, said motor means be operatively connected to said device for determining the speed and direction of rotation of said device according to the light variation sensed in terms of magnitude by said radial light sensitive means behind said radial slit, and in terms of direction of said coordinate axes of said transmitter/receiver pairs.

20. A control apparatus for tracking a device in relationship to a source of light which device can be directionally controlled in two coordinate axes in relation to said light source moving relative to said device and said control apparatus being in fixed spatial correspondence to said device and having its optical axis directed to said light source, said control apparatus comprising the combination of:

(a) sensor means oriented to receive light from said source and including optical means for providing a centered image of the light source (b) onto an opaque rotating control disc perpendicular to said axis and being larger than the provided image of said light source and which disc rotates about its axis, including a light-permeable admitting slit extending radially outward to a predetermined maximum image excursion of said image of said light source on said disc and radially inward at least to the periphery of the centered image of the light source on said disc;

(c) said sensor means having light sensitive means positioned next to said disc on a side of said disc opposite to said image side and responsive to light which penetrates said radial slit;

(d) said disc also including two concentric semi-circular light-permeable slits, each having a different radius;

(e) two light emitter/receiver pairs each operative with a different one of said two semi-circular azimuthal slits, said light emitter/receiver pairs being disposed in such a relationship to one another, that one light emitter/receiver pair is in the center of one corresponding azimuthal slit when the second light emitter/receiver pair is at the beginning of its corresponding azimuthal slit during operation;

(f) the case of said sensor means together with said two light emitter/receiver-pairs which are fixed in the case being stationary but rotatable for initial adjustment around said optical axis such that the radial slit points in the direction of one of the coordinate axes when the first azimuthal receiver is at the beginning of the corresponding azimuthal slit;

(g) motor means for said disc; and (h) motor means, said motor means being operatively connected to said tracking device for determining the speed and direction of rotation by said sensor means according to the light variation sensed in terms of magnitude by said radial light sensitive means behind said radial slit, and in terms of direction of said coordinate axes by said emitter/receivers.

21. A device for evaluation of the relative movement of a light source characterized by the combination of the features (a) to (g) of claim 20 and an electrical circuit receiving the signals from the light sensitive means (c) and the emitter/receiver pairs (f) for signal processing.

* * * * *